(12) United States Patent
Zucker

(10) Patent No.: US 6,184,510 B1
(45) Date of Patent: Feb. 6, 2001

(54) CAKEBOARD AND METHODS OF MANUFACTURING AND USE

(75) Inventor: David Zucker, Philadelphia, PA (US)

(73) Assignee: Rupaco Paper Corporation, Edison, NJ (US)

(*) Notice: Under 35 U.S.C. 154(b), the term of this patent shall be extended for 0 days.

(21) Appl. No.: 09/156,096

(22) Filed: Sep. 17, 1998

Related U.S. Application Data

(60) Provisional application No. 60/064,307, filed on Nov. 5, 1997.

(51) Int. Cl.$^7$ ................................. H05B 6/62; B32B 3/28
(52) U.S. Cl. .................... 219/771; 219/773; 249/DIG. 1; 428/137; 428/138; 428/182
(58) Field of Search ..................... 428/182, 131, 428/137, 138; 426/107; 156/60, 205; 249/DIG. 1; 219/771, 773; 99/352, 355, DIG. 15; 126/273 R; 206/557; 229/906

(56) References Cited

U.S. PATENT DOCUMENTS

| | | |
|---|---|---|
| 491,977 | 2/1893 | Bingham . |
| 1,301,197 | 4/1919 | Tully . |
| 1,781,302 | 11/1930 | Roberts . |
| 2,297,914 | 10/1942 | Pino . |
| 2,318,820 * | 5/1943 | Voigt et al. ............. 428/182 |
| 2,407,118 | 9/1946 | Waters . |
| 3,054,703 | 9/1962 | Brasure . |
| 3,127,828 | 4/1964 | Fine . |
| 3,347,181 | 10/1967 | Pizzo . |
| 3,406,052 | 10/1968 | Peters . |
| 3,411,433 | 11/1968 | Christopher . |
| 4,150,186 * | 4/1979 | Kazama .................. 428/140 |
| 4,262,050 | 4/1981 | Jenkins . |
| 4,389,315 | 6/1983 | Crocket . |
| 4,391,833 | 7/1983 | Self et al. . |
| 4,418,119 | 11/1983 | Morrow et al. . |
| 4,441,626 | 4/1984 | Hall . |
| 4,452,356 | 6/1984 | Dahl . |
| 4,776,459 | 10/1988 | Beckerman et al. . |
| 4,867,303 | 9/1989 | Beckerman et al. . |
| 4,950,524 | 8/1990 | Hacker . |
| 5,482,724 | 1/1996 | Morici et al. . |
| 5,565,228 | 10/1996 | Gics . |
| 5,609,293 | 3/1997 | Wu et al. . |
| 5,613,427 | 3/1997 | Wiley . |
| 5,698,295 | 12/1997 | Benner et al. . |

* cited by examiner

*Primary Examiner*—Donald Loney
(74) *Attorney, Agent, or Firm*—Frommer Lawrence & Haug LLP; Thomas J. Kowalski

(57) ABSTRACT

A cakeboard useful for direct transfer of a cake from the oven, for finishing and serving, without the need for a cooling rack. The cakeboard can have a first layer of corrugated cardboard and a second layer of PET. The first layer can have its top liner perforated with microperforations to permit venting of heat and moisture, thus allowing cakes to be turned from the oven directly onto the cakeboard to cool before finishing and serving, thereby removing the need for turning cakes onto separate cooling racks before transferring them to the cakeboard, thereby reducing handling. The microperforations can be added after the layers are affixed to each other such that the microperforations pierce the top second layer and the top liner of the first layer. The first and second layers can be comprised of other materials; and, other layers may be present.

19 Claims, 3 Drawing Sheets

CAKEBOARD AND METHODS OF MANUFACTURING AND USE

RELATED APPLICATIONS

Reference is made to U.S. application Ser. No. 60/064,307, filed Nov. 5, 1997, now abandoned incorporated herein by reference. In addition, all documents cited therein and herein are also incorporated herein by reference.

FIELD OF THE INVENTION

The present invention relates to a cakeboard and to methods of making and using it. The cakeboard of the invention permits venting of heat and moisture so that cakes may be turned out from the oven directly onto the cakeboard to cool before finishing and serving, removing the need for turning out cakes onto separate cooling racks before transferring them to a cakeboard. The present invention thus reduces the handling a cake must endure between the oven and serving. The present invention also reduces the risk of damage to a cake in preparation. And therefore, the present invention reduces the losses suffered from damage to cakes during preparation. The inventive cakeboard can be any suitable size or shape, e.g., round, square, rectangle, etc, and can have plan or scalloped edges. The sizes and shapes for an inventive cakeboard can be matched to cake pans used in baking.

More specifically, the invention relates to a board comprising a first, heat transmitting layer, which is preferably comprising corrugated cardboard, and a second, grease and/or moisture and/or heat resistant layer, preferably comprising a an elastomer or a thermoplastic such as a polyethylene terephthalate (polyester; or PET), or a polybutylene terephthalate (PBT), or a copolymer of polyethylene terephthalate (polyester; or PET), or copolymer of polybutylene terephthalate (PBT), or a polypropylene, or a polyethylene such as a polyethylene from a single site catalyst system, or a metal foil. In preferred embodiments, the second layer is from PET, PBT, coPET, coPBT, polypropylene, or polyethylene, most preferably, PET; and, the second layer is metallized, e.g., in gold, silver or another color. Further, in preferred embodiments, the second layer can have perforations.

The first and second layers can be joined in any desired manner, e.g., extrusion, lamination, and the like; but, preferably the first and second layers are laminated together. Thus, in certain embodiments there is a third layer of laminating material positioned between the first and second layers. The invention therefore contemplates a method of manufacture comprising laminating the first and second layers. And, the invention contemplates methods of using the cakeboard, e.g., providing a cakeboard of the invention and placing a cake upon it, such as a cake fresh from the oven.

BACKGROUND OF THE INVENTION

Boards for holding finished cakes are known. A problem with these boards has been that they have not been capable of accepting a cake fresh from the oven. In other words, it is common in the art to bake a cake, place it on a cooling rack, and then transfer the cooled cake to a cakeboard for finishing. (Finishing a cake can entail adding layers and/or icing.)

Thus, it is another problem in the art that placing a cake onto a cooling rack after baking, instead of directly onto a cakeboard, means an additional handling step in the preparation of a cake. This additional handling step means a loss of efficiency in cake preparation.

Further, this additional handling step provides yet a further problem in the art; namely, potential for damage to the cake prior to finishing it, and consequential losses therefrom. For instance, if a cake is broken while being transferred from the cooling rack to the cakeboard, the baker may have to scrap the cake and bake it again, meaning a loss of time and materials and therefore a loss of revenue.

It would therefore be desirable to provide a cakeboard which can directly accept a cake—fresh from the oven—to address any or all of the problems in the art.

In addition, a cakeboard which can directly accept a cake—fresh from the oven—provides additional advantages over that which has come before. For instance, instead of having to purchase cooling racks and cakeboards, the baker need only purchase the inventive cakeboard, providing an economic advantage; namely, that only one board—used by both the baker and the ultimate consumer—need be purchased by the baker for holding the cake after it is baked. Further, since only one board need be used, the present invention can provide ecological advantages, e.g., reduced waste, since only one board, rather than a board and a cooling rack, need be used.

Reference is made to U.S. Pat. Nos. 4,867,303, 4,776,459 and 4,389,315 and to the following listed documents, incorporated herein by reference, which either individually, or in any combination, fail to teach or suggest the present invention:

| U.S. PAT. NO. | INVENTOR |
| --- | --- |
| 491,977 | Bingham |
| 1,301,197 | Tully |
| 1,781,302 | Roberts |
| 2,297,914 | Pino |
| 2,407,118 | Waters |
| 3,054,703 | Brasure |
| 3,127,828 | Fine |
| 3,347,181 | Pizzo |
| 3,406,052 | Peters |
| 3,411,433 | Christopher |
| 4,262,050 | Jenkins |
| 4,391,833 | Self et al. |
| 4,418,119 | Morrow et al. |
| 4,441,626 | Hall |
| 4,452,356 | Dahl |
| 4,950,524 | Hacker |
| 5,482,724 | Morici et al. |
| 5,565,228 | Gics |
| 5,609,293 | Wu et al. |
| 5,613,427 | Wiley |
| 5,698,295 | Benner et al. |

For instance, U.S. Pat. No. 4,452,356 to Dahl illustrates, in FIG. 1, a cakeboard or base 10 having a corrugated cardboard layer coated on its upper surface with plastic material 10a. In contrast to the present invention, no perforations are present and the cakeboard is not specifically used to dissipate or transmit heat.

U.S. Pat. Nos. 4,441,626 to Hall, 5,482,724 to Morici et al. and 5,565,228 to Gics relate to corrugated paperboard inserts or trays for use in pizza boxes. In the Morici et al. patent, FIGS. 1–3 show a generally flat pizza tray made of corrugated paperboard and including on its upper surface a parchment-like coating. Note that the paperboard is also provided with a plurality of linear, elongated slots therethrough to facilitate the capture of moisture and juices exuded by the pizza. However, in contrast to the present invention, there does not appear to be any teaching or suggestion of the perforations in the present invention or their particular use.

U.S. Pat. No. 3,054,703 to Brasure is directed to a laminated structure and process for making, in which a cardboard base (see column 1, line 43) is adhesively bonded to a PET web. The laminate is useful as a protective covering for thermal insulation. U.S. Pat. No. 4,418,119 to Morrow et al. provides an ovenable bakery food board comprising a paperboard base coated with polyvinyl alcohol and a silicone. U.S. Pat. Nos. 3,406,052 to Peters, 4,262,050 to Jenkins, 5,609,293 to Wu et al. and 5,698,295 to Benner et al. relate to corrugated boards including at least a protective polymer film or layer on at least one of its faces. The patent to Peters, in particular, provides a method of making the corrugated board/plastic laminate by extruding the plastic layer onto the corrugated board. However, in contrast to the present invention, these patents do not appear to teach or suggest the perforations in the present invention or their particular use.

U.S. Pat. No. 491,977 to Bingham is directed to a cooling board having perforations which is specifically used for cooling baker products (e.g., bread) after baking. However, there does not appear to be any teaching or suggestion of the board being a corrugated board with a grease and/or moisture and/or heat resistant layer, e.g., a foil or PET layer.

U.S. Pat. Nos. 2,407,118 to Waters, 3,411,433 to Christopher and 5,613,427 to Wiley relate to baking pans or liners per se of multilayer construction. The Waters patents provides, in one embodiment, a baking pan make of cardboard laminated with metal foil. Christopher's patent provides a baking container having three laminated layers, namely a top perforated foil layer, a bottom layer of imperforate foil, and a center layer of mesh material designed to entrap air and to absorb grease and moisture flowing during baking through the perforations of the first layer. Wiley's patent (see FIGS. 11 and 12) provides a pan liner in which a thermoplastic layer (having perforations thereon) is bonded to a cellulosic fiber layer (also having perforations therethrough). However, in contrast to the present invention, there does not appear to be any teaching or suggestion in these patents of a corrugated board with a grease and/or moisture and/or heat resistant layer, e.g., a foil or PET layer and perforations as in the present invention.

U.S. Pat. No. 1,301,197 to Tully is directed to a culinary utensil provided with a corrugated base and a perforated, substantially planar member overlying the base. There does not appear to be any teaching or suggestion in this patent of a corrugated board with a grease and/or moisture and/or heat resistant layer, e.g., a foil or PET layer and perforations as in the present invention.

U.S. Pat. Nos. 1,781,302 to Roberts and 2,297,914 to Pino provide pie or baking pans per se incorporated with ventilating apertures. However, in contrast to the present invention, there does not appear to be any teaching or suggestion in these patents of a corrugated board with a grease and/or moisture and/or heat resistant layer, e.g., a foil or PET layer and perforations as in the present invention.

And, as to U.S. Pat. Nos. 4,867,303, 4,776,459 and 4,389,315. The lattermost patent appears directed to a filter device, whereas the first two patents are related to each other and pertain to a bakery foods package which can include a base from corrugated board provided with an upper foil layer. However, there does not appear to be any teaching or suggestion of the perforations as in the present invention.

Accordingly, not only would it be desirable to provide a cakeboard which can directly accept a cake—fresh from the oven—to address any or all of the problems in the art, as in the present invention, it is believed that heretofore the art has not provided, taught or suggested a cakeboard or methods for making or using a cakeboard, as in the present invention.

OBJECTS AND SUMMARY OF THE INVENTION

It is an object of the invention to address any or all of the issues raised by the prior art requirement of using a cooling rack for a cake from the oven, prior to finishing and serving the cake; and, it is another object of the invention to provide a board which can accept a cake fresh from the oven, such that the prior use of a cooling rack may be avoided or minimized.

It has surprisingly been found that there can be a cakeboard which permits venting of heat and moisture so that cakes may be turned out from the oven directly onto the cakeboard to cool before finishing and serving, removing the need for turning out cakes onto separate cooling racks before transferring then to a cakeboard.

Accordingly, the present invention provides a board comprising a first, heat transmitting layer, and a second, grease and/or moisture and/or heat resistant layer.

The first layer is preferably comprised of corrugated cardboard. Other suitable materials would include those having an air layer similar to corrugated cardboard.

Thus, the invention can contemplate a board comprising a first layer of corrugated cardboard and a second, grease and/or moisture and/or heat resistant layer.

The second layer is preferably comprised of an elastomer or a thermoplastic. A typical thermoplastic can be a polyethylene terephthalate (polyester; or PET), or a polybutylene terephthalate (PBT), or a copolymer of polyethylene terephthalate (polyester; or PET), or copolymer of polybutylene terephthalate (PBT), or a polypropylene, or a polyethylene such as a polyethylene from a single site catalyst system; or a metal foil.

In more preferred embodiments, the second layer is comprised of PET, PBT, copet, copbt, polypropylene, or polyethylene; and, in most preferred embodiments the second layer is comprised of PET.

Thus, the invention comprehends, a board comprising a first, heat transmitting layer, and a second layer comprised of a thermoplastic, an elastomer, or a metal foil. The invention further comprehends a board comprising a first layer comprised of corrugated cardboard and a second layer comprised of a thermoplastic or a metal foil. The invention likewise comprehends a board comprising a first layer comprised of corrugated cardboard and a second layer comprised of a polyethylene terephthalate (polyester; or PET), or a polybutylene terephthalate (PBT), or a copolymer of polyethylene terephthalate (polyester; or PET), or copolymer of polybutylene terephthalate (PBT), or a polypropylene, or a polyethylene such as a polyethylene from a single site catalyst system, or a metal foil.

The first layer, preferably of corrugated cardboard, is generally about 0.16 inches thick, and the second layer, preferably of PET, is generally about 0.0048 inches thick.

In preferred embodiments when the second layer is comprised of a thermoplastic, it is metallized, e.g., in gold, silver or another color.

Further, in preferred embodiments, the second layer can have perforations. The perforations can have a diameter of from about 1/16 inch to about 1/32 inch, preferably about 1/32 inch; and, there can be about one (1) to about four (4)

perforations per inch. When the diameter is larger, e.g., about 1/16 inch, there are generally less perforations per inch than when the diameter is smaller. Thus, when the diameter is approximately 1/32 inch, there are preferably about 4 perforations per inch. The perforations can be through the second and third layers, as described herein.

The first and second layers can be joined in any desired manner, e.g., extrusion, lamination, and the like; but, preferably the first and second layers are laminated together. A typical machine for lamination useful in the practice of the invention is an Inta-roto Laminator or a Parry Linear or Waldron Coater. However, any suitable web-laminating machine may be used in the practice of the invention; and, from this disclosure and the knowledge in the art, one skilled in the art can obtain or design a suitable machine.

Thus, in certain embodiments there is a third layer of laminating material positioned between the first and second layers. Accordingly, the invention can contemplate a board as described above further comprising a third adhesive layer positioned between the first and second layers. A typical laminating material is polyvinyl resin adhesive. This layer can be approximately 0.001 to about 0.003 inches thick.

The invention therefore contemplates a method of manufacture comprising joining the first and second layers. The method preferably comprises adhesively joining or laminating the first and second layers.

The invention also contemplates methods of using the cakeboard, e.g., providing a cakeboard of the invention and placing a cake upon it, such as a cake fresh from the oven.

The processes and substances used preferably comply with the provisions of 21 C.F.R. §§175.105 and 177.1630, incorporated herein by reference.

A cakeboard which can directly accept a cake—fresh from the oven—provides additional advantages over that which has come before. For instance, instead of having to purchase cooling racks and cakeboards, the baker need only purchase the inventive cakeboard, providing an economic advantage; namely, that only one board—used by both the baker and the ultimate consumer—need be purchased by the baker for holding the cake after it is baked. Further, since only one board need be used, the present invention can provide ecological advantages, e.g., reduced waste, since only one board, rather than a board and a cooling rack, need be used.

These and other embodiments are disclosed or are obvious from and encompassed by, the following Detailed Description.

BRIEF DESCRIPTION OF THE FIGURES

The following Detailed Description, given by way of example, but not intended to limit the invention to specific embodiments described, may be understood in conjunction with the accompanying Figures, incorporated herein by reference, in which.

DETAILED DESCRIPTION

Figure 1:
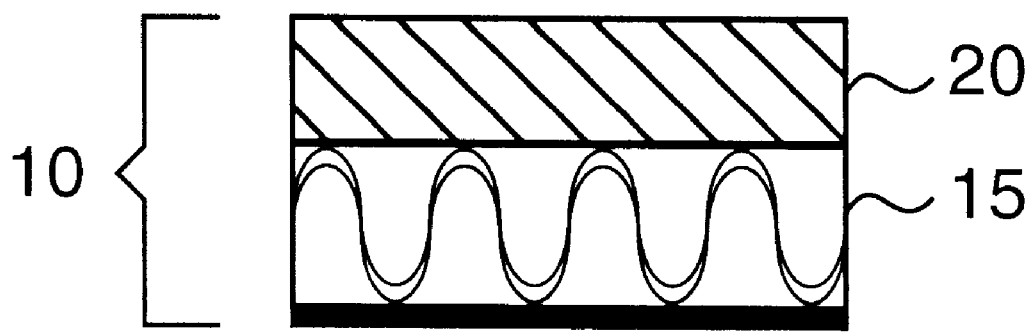
FIG. 1 shows a cross-section (not to scale) of a first embodiment of the invention.

FIG. 1 shows a first embodiment, cakeboard 10, comprised of first heat transmitting layer 15, and a second, grease and/or moisture and/or heat resistant layer 20, with the second layer 20 positioned above first layer 15. A cake, such as a cake fresh from the oven, would be positioned on top of second layer 20.

The first layer 15 is preferably comprised of corrugated cardboard. Layer 15 is typically approximately 0.160 inches thick.

The second layer 20 is preferably comprised of a thermoplastic, e.g., a polyethylene terephthalate (polyester; or PET), or a polybutylene terephthalate (PBT), or a copolymer of polyethylene terephthalate (polyester; or PET), or copolymer of polybutylene terephthalate (PBT), or a polypropylene, e.g., oriented polypropylene, or a polyethylene, e.g., LDPE, LLDPE, ULDPE, VLDPE, HDPE, or a polyethylene from a single site catalyst system; or of a metal foil.

In more preferred embodiments, the second layer is comprised of PET, PBT, coPET, coPBT, polypropylene, or polyethylene; and, in most preferred embodiments the second layer is comprised of PET.

The second layer could also be from an elastomer, e.g., a suitable elastomeric polymer such as butadiene styrene copolymer, polymethylpentene, polybutylene, polyisobutylene, ethylene propylene diene monomer terpolymer, styrene butadiene styrene copolymer, styrene ethylene butylene copolymer, styrene isoprene styrene copolymer, polybutene-1, isobutylene rubber, methyl acrylate butadiene styrene copolymer, acrylonitrile butadiene styrene copolymer, acrylonitrile alkylacrylate butadiene styrene copolymer, methyl methacrylate alkyl acrylate styrene copolymer, methyl methacrylate alkyl acrylate butadiene styrene copolymer, and the like.

Layer 20 is typically approximately 0.48 inches thick.

The embodiment shown in FIG. 1 can be fabricated by directly extruding, in sheet form, the second layer onto the first layer.

Figure 2:
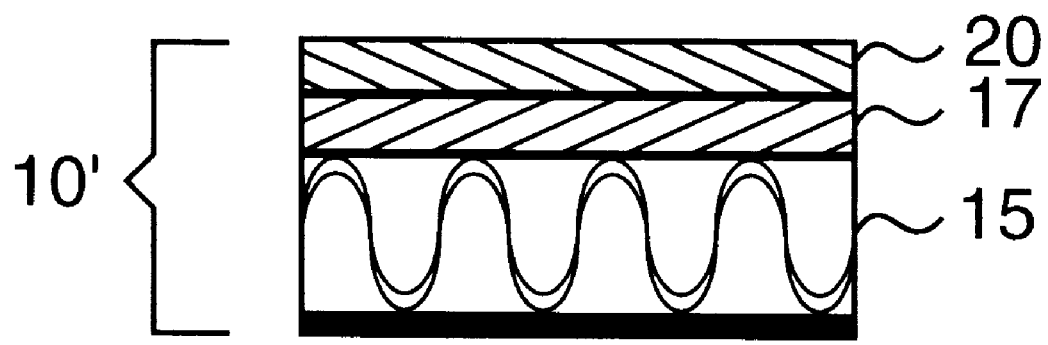
FIG. 2 shows a cross-section (not to scale) of a second embodiment of the invention.

FIG. 2 shows a second embodiment of the invention, cakeboard 10', wherein between layers 15 and 20 is adhesive layer 17. The adhesive is preferably a moisture-resistant adhesive, such as vinyl acetate ethylene. Layer 17 is typically approximately 0.001 inches thick.

For this embodiment, the cakeboard can be fabricated by coating the adhesive 17 onto layer 20, and then placing layer 15 over the adhesive Adhesive layer 17 can be any suitable adhesive to laminate layers 15 and 20 to each other, such as solvent or liquid adhesive, e.g., water-based or urethane adhesive, or solid adhesive. The adhesive should not detract from the desired characteristics of the board. Preferred adhesives for layer 17 are solventless adhesives such as the TYCEL® laminating adhesives available from the Lord Corporation, e.g., the TYCEL® 7975 Adhesive and TYCEL® 7276 curing agent. Alternatively, the adhesive layer 17 can be an extruded adhesive material such as a copolymer of ethylene and an ethylenically unsaturated comonomer, for instance ethylene vinyl acetate (EVA). Thus, both layers 17 and 20 can be extruded onto layer 15.

Like the embodiment of FIG. 1, in the embodiment of FIG. 2, a cake, such as a cake fresh from the oven, would be positioned on top of second layer 20.

Figure 3A:
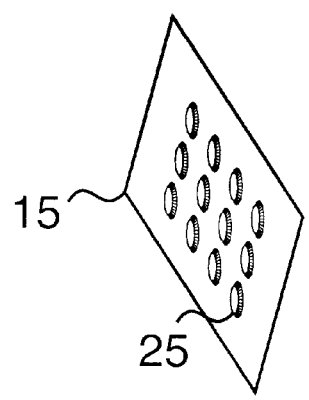
FIG. 3A shows a top view of a layer for an embodiment of the invention (not to scale)

FIG. 3A shows a top view of an alternative layer 15' for alternative embodiments of the invention. This alternative layer can be comprised of corrugated cardboard wherein the top liner of the corrugated cardboard has been perforated with microperforations 25 to permit venting of heat and moisture. Using alternative layer 15' for a cakeboard optimizes the ability to transfer a cake from the oven to the cakeboard for finishing and serving, without the need for an intermediate transfer to a cooling rack.

Figure 3B:
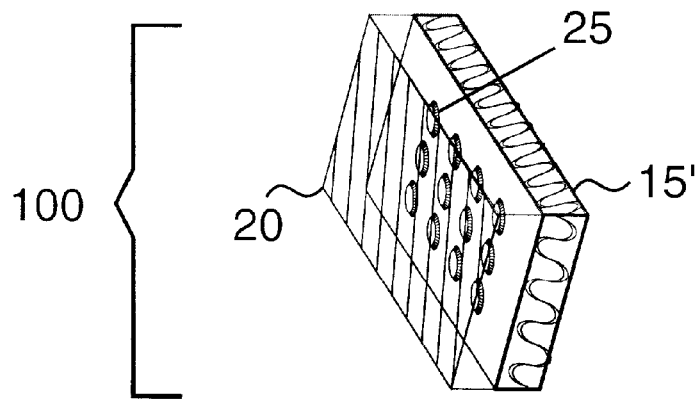
FIGS. 3B and 3C show cross-sections (not to scale) of third and fourth embodiments of the invention employing the layer of FIG. 3A.

The alternative layer 15' thus provides a third embodiment of the invention, cakeboard 100, depicted in FIG. 3B, which is analogous to cakeboard 10, with layer 20 positioned over layer 15' (over microperforations 25). Like the embodiment of FIG. 1, in the embodiment of FIG. 3B, a cake, such as a cake fresh from the oven, would be positioned on top of second layer 20.

Figure 3C:
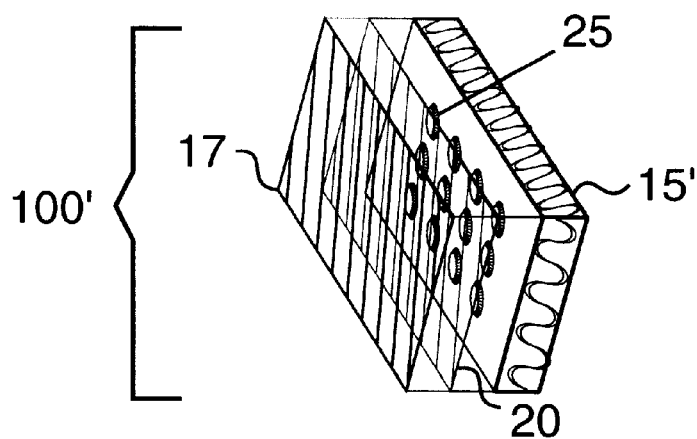

And, alternative layer 15' further provides the fourth embodiment of the invention, cakeboard 100', depicted in FIG. 3C, which is analogous to cakeboard 10', with layer 17 positioned over layer 15' (over microperforations 25) and layer 20 positioned over layer 17. Like the embodiment of FIG. 2, in the embodiment of FIG. 3C, a cake, such as a cake fresh from the oven, would be positioned on top of second layer 20.

As shown by FIGS. 3A to 3C, a method of manufacture for the invention can comprise perforating the cardboard layer and then affixing thereto layer 20 or layers 17 and 20.

Figure 4A:
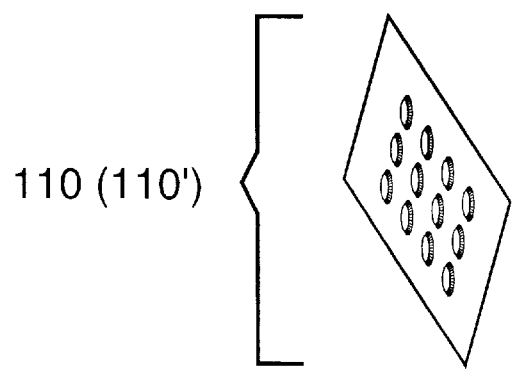
FIG. 4A shows a top view of fifth and sixth embodiments of the invention (not to scale); and, FIGS. 4B and 4C show cross-sections (not to scale) of the fifth and sixth embodiments.
Figure 4B:
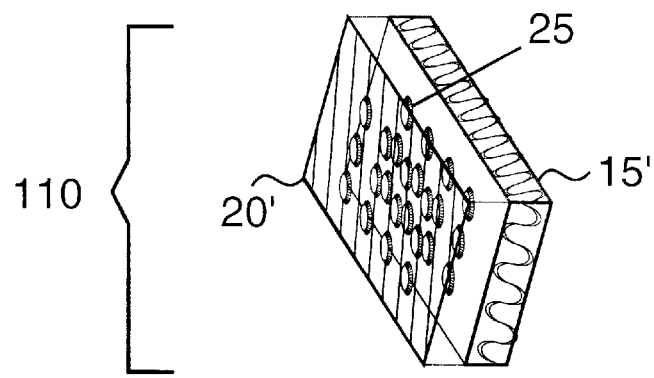
Figure 4C:
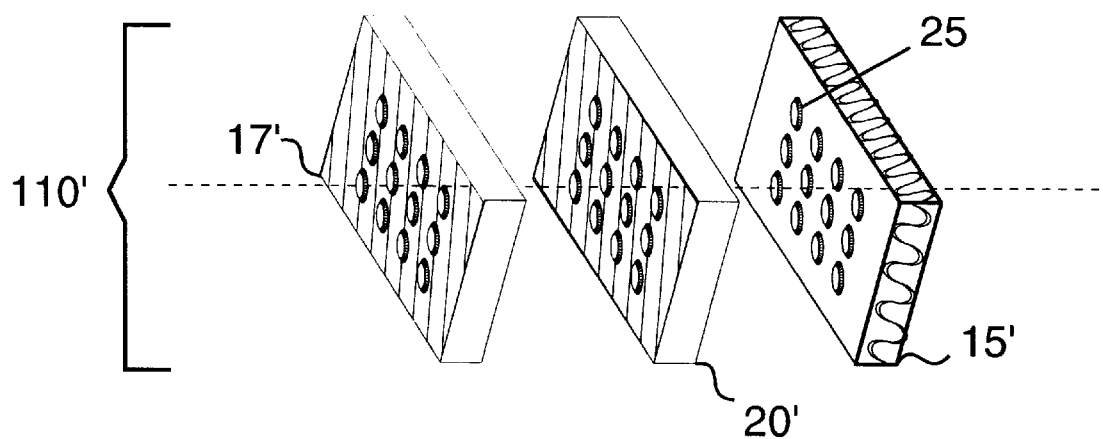

Alternatively, preferred embodiments 110 and 110' as shown in FIGS. 4A to 4C are produced by affixing second layer 20' or second and third layers 20' and 17' to first layer 15' which are analogous to similarly numbered layers in earlier described and depicted embodiments, and then adding perforations 25, such that perforations 25 pierce the second or second and third layers, as well as the top liner of corrugated cardboard layer 15'. Thus, structures 15'/17'/20' and 15'/20' wherein perforations 25 pierce layers 20' or 20' and 17' and the top liner of layer 15' are contemplated by the invention.

Accordingly, in the manufacture of a preferred embodiment (FIGS. 4A to 4C), the second layer 20' preferably comprised of PET, and the top liner of the first layer 15' preferably comprised of corrugated cardboard are fed from webs through a coater-laminator, typically an Ina-Roto Laminator or Parry Liner or Waldron Coater or the like. A layer of adhesive 17' is coated onto the board layer 15' or the PET layer 20' and then the layers are joined together at the nip rollers and passes through a drying section where, through a combination of heat and pressure the layers are adhered together such that the structure 15' (top liner only)/17'/20' is formed. The structure is then rewound onto a roll and transported to a corrugating machine where the optional metallic film (not shown) is laminated on, and where the laminated corrugated board is made. The board comes off in sheets and is then die cut and perforated on a Thomsom platen type die cutting press or a Bobst cylinder type die cutting press. An alternative method of perforating would be to feed the sheets of corrugated board through perforating rollers and before die cutting the various shapes.

Like the embodiment of FIG. 2, in the embodiment of FIGS. 4A to 4C, a cake, such as a cake fresh from the oven, would be positioned on top of second layer 20'.

The boards of the invention can be any suitable thickness. Thickness can be varied as desired, depending upon the end use for the board; but, the board should, in overall thickness, be sufficient to support a fully finished cake. Typical thicknesses may be up to about 0.25 to about 0.50 inches, e.g., up to 0.64 to 1.3 cm. With reference to FIGS. 1–4C, layer 15 or 15' is generally the thickest layer, and may be up to nearly 0.25 to 0.50 thick, whereas layers 17 (17') and 20 (20') are typically about 0.1 to 2.0 mils thick, with layer 20 (20') preferably about 1.0 to 1.5 mils thick and layer 17 (17') typically about 0.1 to about 1.5 mils thick.

Further, while the invention has been illustrated with respect to one—and two—layers over layer 15 or 15', additional layers may be present. However, it is desirable that the board exhibits the permeability (OTR), and grease, moisture and heat resistance of the illustrated and exemplified boards. If additional layers are present, the outer layer (layer 20 or 20' in FIGS. 1–4C) should be from a resistant or elastomer, as discussed above. Thus, between layers 15 or 15' and 20 or 20', between layers 17 or 17' and 20 or 20' or between both layers 15 or 15' and 20 or 20' and layers 17 or 17' and 20 or 20' can be an additional layer or layers from any suitable material such as polyethylene, LDPE, LLDPE, ULDPE, VLDPE, HDPE, polypropylene, oriented polypropylene, single site catalyst polyethylene, an elastomer (such as those mentioned above for layer 20 or 20' or other commercially available materials such as ethylene-propylene and ethylene-butene copolymer elastomers), or blends thereof. However, given the excellent performance of the exemplified embodiments of the invention and economic and ecological considerations, additional layers are not considered necessary.

As discussed above, layer 20 or 20', when comprised of a thermoplastic or elastomer, can be metallized, e.g., metallized in gold, silver, or any other desired color. The boards are die cut into various shapes, e.g., round or circular, square, rectangular, etc.; and, can be cut to match the various shapes and sizes of cake pans used in baking.

In use, the baker transfers the cake, preferably directly from the oven, onto the inventive cakeboard; and, the cake is then finished (e.g., layered, iced) and served on the cakeboard. Thus, preferably the cakeboard should be thick enough to support an entire finished cake, and to allow for cutting of the cake (without damage to a surface below the board).

Having thus described in detail preferred embodiments of the present invention, it is to be understood that the invention defined by the appended claims is not to be limited by particular details set forth in the above description as many apparent variations thereof are possible without departing from the spirit or scope thereof.

What is claimed is:

1. A method of using a board wherein the board comprises a cakeboard comprising a first heat transmitting layer, and a second, grease or moisture or heat resistant layer, with the second layer positioned above first layer, and the first layer comprised of corrugated cardboard having a top liner and the top liner has means defining microperforations, and the second layer comprised of a thermoplastic, an elastomer, or a metal foil; and said method comprising baking a cake and transferring it directly from the oven onto the cakeboard, whereby the cakeboard is capable of being used by a baker for holding the cake after it is baked and by an ultimate consumer of the cake for holding the cake, and is capable of avoiding the use of a separate cooling rack by the baker.

2. The method of claim 1 wherein the thermoplastic is comprised of a polyethylene terephthalate, or a polybutylene terephthalate, or a copolymer of polyethylene terephthalate, or copolymer of polybutylene terephthalate, or a polypropylene, or an oriented polypropylene, or a polyethylene, or a LDPE, or a LLDPE, or a ULDPE, or a VLDPE, or a HDPE, or a polyethylene from a single site catalyst system.

3. The method of claim 1 wherein the elastomer is comprised of butadiene styrene copolymer, polymethylpentene, polybutylene, polyisobutylene, ethylene propylene diene monomer terpolymer, styrene butadiene styrene copolymer, styrene ethylene butylene copolymer, styrene isoprene styrene copolymer, polybutene-1, isobutylene rubber, methyl acrylate butadiene styrene copolymer, acrylonitrile butadiene styrene copolymer, acrylonitrile alkylacrylate butadiene styrene copolymer, methyl methacrylate alkyl acrylate styrene copolymer, or methyl methacrylate alkyl acrylate butadiene styrene copolymer.

4. The method of claim 1 wherein the second layer is comprised of PET, PBT, coPET, coPBT, polypropylene, or polyethylene.

5. The method of claim 1 wherein the second layer is comprised of PET.

6. The method of claim 1 wherein the second layer is comprised of metal foil.

7. The method of claim 1 wherein the cakeboard further comprises a third adhesive layer positioned between the first and second layers.

8. The method as claimed in claim 1 wherein the microperforations extend through to the second layer.

9. The method as claimed in claim 5 wherein the microperforations extend through to the second layer.

10. The method as claimed in claim 6 wherein the microperforations extend through to the second layer.

11. The method as claimed in claim 7 wherein the microperforations extend through to the second layer.

12. The method of claim 1 further comprise fabricating the cakeboard by steps comprising joining the first and second layers, and adding microperforations to a top liner of the first layer or to the top liner of the first layer through to the second layer.

13. The method of claim 12 wherein the second layer is extruded onto the first layer.

14. The method of claim 12 wherein the second layer is adhesively affixed to the first layer by a third adhesive layer.

15. The method of claim 14 wherein the second and third layers are extruded onto the first layer.

16. The method of claim 14 wherein the second layer is laminated onto the first layer by having the third layer coated onto the first layer and the second layer added onto the third layer.

17. The method of claim 12 wherein microperforations are added to a top liner of the first layer.

18. The method of claim 12 wherein microperforations are added to the top liner of the first layer through to the second layer.

19. The method of claim 18 wherein the first layer is comprised of corrugated cardboard and the second layer is comprised of metal foil or PET.

\* \* \* \* \*